(12) United States Patent
Nakamura et al.

(10) Patent No.: US 12,540,877 B2
(45) Date of Patent: Feb. 3, 2026

(54) OPTICAL TRANSMISSION LINE TEST EQUIPMENT AND TEST METHOD

(71) Applicant: NTT, Inc., Tokyo (JP)

(72) Inventors: Atsushi Nakamura, Musashino (JP); Tomokazu Oda, Musashino (JP); Yusuke Koshikiya, Musashino (JP)

(73) Assignee: NTT, Inc., Tokyo (JP)

( * ) Notice: Subject to any disclaimer, the term of this patent is extended or adjusted under 35 U.S.C. 154(b) by 85 days.

(21) Appl. No.: 18/707,958

(22) PCT Filed: Nov. 11, 2021

(86) PCT No.: PCT/JP2021/041494
§ 371 (c)(1),
(2) Date: May 7, 2024

(87) PCT Pub. No.: WO2023/084679
PCT Pub. Date: May 19, 2023

(65) Prior Publication Data
US 2024/0426703 A1    Dec. 26, 2024

(51) Int. Cl.
*G01M 11/00*    (2006.01)
(52) U.S. Cl.
CPC .... *G01M 11/3136* (2013.01); *G01M 11/3127* (2013.01); *G01M 11/3145* (2013.01)
(58) Field of Classification Search
CPC ......... G01M 11/3136; G01M 11/3127; G01M 11/3145; G01M 11/02; G02B 6/02
See application file for complete search history.

(56) References Cited

U.S. PATENT DOCUMENTS 8,503,847 B2 * 8/2013 Kokubun ........... H04B 10/2581
385/126

FOREIGN PATENT DOCUMENTS

JP    H04351935 A    12/1992
JP    2012202827 A  * 10/2012

OTHER PUBLICATIONS

Masataka Nakazawa, Masato Yoshida, and Toshihiko Hirooka, "Measurement of mode coupling distribution along a few-mode fiber using a synchronous multi-channel OTDR," Opt. Express 22, 31299-31309 (2014) (Year: 2014).*

(Continued)

*Primary Examiner* — Kara E. Geisel
*Assistant Examiner* — Christina I Xing
(74) *Attorney, Agent, or Firm* — Harness, Dickey & Pierce, P.L.C.

(57) ABSTRACT

An object of the present invention is to provide an optical transmission line test apparatus and a test method capable of measuring a cumulative crosstalk of an optical transmission line in which a plurality of uncoupled multi-core fibers are connected in series from one end side with an OTDR.

An optical transmission line test apparatus 301 according to the present invention measures a cumulative crosstalk of an optical transmission line 50 in which a plurality of uncoupled multi-core fibers 50-i are connected in series. The optical transmission line test apparatus 301 includes a test light input unit 10 that inputs optical pulses to each of cores of the uncoupled multi-core fiber 50-1 at one end 50a of the optical transmission line 50; a reception unit 20 that receives backscattered light for each of the cores output from one end 50a; and a calculation unit 30 that acquires a loss distribution occurring in each of the cores from the backscattered light, and calculates the cumulative crosstalk from a connection loss at a connection point zj of the uncoupled multi-core fiber obtained from the loss distribution and a known inter-core mode coupling of each of the uncoupled multi-core fibers 50-i.

6 Claims, 3 Drawing Sheets

(56) References Cited

OTHER PUBLICATIONS

Yoshida, Makoto et al. "Mode Coupling Measurement at Few-Mode Fiber Connections Using Multi-Channel OTDR". Proceedings of the 2016 IEICE General Conference with machine generated English translation thereof. (2016).
M. Nakazawa et al., "Nondestructive measurement of mode couplings along a multi-core fiber using a synchronous multi-channel OTDR," Optics Express, vol. 20, No. 11, pp. 12530-12540, 2012.
M. Ohashi et al., "Simple backscattered power technique for measuring crosstalk of multi-core fibers," in Proc. 7th Opto-Electronics and Communications Conference, p. 1_25, 2012.

* cited by examiner

OPTICAL TRANSMISSION LINE TEST EQUIPMENT AND TEST METHOD

CROSS-REFERENCE TO RELATED APPLICATIONS

This application is a 371 U.S. National Phase of International Application No. PCT/JP2021/041494, filed on Nov. 11, 2021. The entire disclosure of the above application is incorporated herein by reference.

TECHNICAL FIELD

The present disclosure relates to an optical transmission line test apparatus and a test method for testing an optical transmission line in which a plurality of uncoupled multi-core fibers are connected in series.

BACKGROUND ART

An uncoupled multi-core fiber is one promising optical fiber as a medium for achieving future large-capacity optical communication. Crosstalk between cores of uncoupled multi-core fibers is an important parameter that limits transmission capacity. Therefore, in order to ensure a desired transmission capacity, it is necessary to evaluate whether a cumulative crosstalk of the entire transmission line is within an allowable range. Crosstalk caused by the optical fibers themselves, input/output devices, etc. can be measured when they are manufactured.

For example, NPL 1 and NPL 2 disclose a crosstalk measuring method using an optical pulse tester (optical time domain reflectometer: OTDR). These methods include inputting optical pulses to one core of the multi-core fiber, measuring intensities of backscattered light output from the core (input core) and an adjacent core thereto, and calculating crosstalk from a ratio between them.

CITATION LIST

Non Patent Literature

[NPL 1] M. Nakazawa et al., "Nondestructive measurement of mode couplings along a multi-core fiber using a synchronous multi-channel OTDR," Optics Express, vol. 20, No. 11, pp. 12530-12540, 2012.
[NPL 2] M. Ohashi et al., "Simple backscattered power technique for measuring crosstalk of multi-core fibers," in Proc. 7th Opto-Electronics and Communications Conference, P1_25, 2012.

SUMMARY OF INVENTION

Technical Problem

On the other hand, in the case of an optical transmission line in which a plurality of uncoupled multi-core fibers are connected in series, since the connection point has an influence on cumulative crosstalk, it is necessary to evaluate the influence when constructing the optical transmission line. When constructing an optical transmission line, it is necessary to input test light from one end of the optical transmission line and to perform a test using backscattered light since the test from both ends of the optical fiber is difficult in operation.

However, the light intensity of the backscattered light output from the cores (adjacent cores) adjacent to the core (input core) to which the test light is input is extremely small compared with the intensity of the backscattered light from the input core. Therefore, there is a problem that, unless the cumulative crosstalk is in a region where the cumulative crosstalk is large to some extent, the dynamic range of the OTDR is insufficient, and it is difficult to directly measure the cumulative crosstalk.

In order to solve the above problem, an object of the present invention is to provide an optical transmission line test apparatus and a test method capable of measuring the cumulative crosstalk of an optical transmission line, in which a plurality of uncoupled multi-core fibers are connected in series, from one end side with an OTDR.

Solution to Problem

In order to achieve the above object, an optical transmission line test apparatus according to the present invention calculates a cumulative crosstalk of an entire optical transmission line from loss characteristics that can be easily measured by an OTDR.

Specifically, an optical transmission line test apparatus according to the present invention is an optical transmission line test apparatus for measuring a cumulative crosstalk of an optical transmission line in which a plurality of uncoupled multi-core fibers are connected in series, the optical transmission line test apparatus including:
  a test light input unit configured to input an optical pulse to each of cores of the uncoupled multi-core fiber from one end of the optical transmission line;
  a reception unit configured to receive backscattered light for each of the cores at one end of the optical transmission line; and
  a calculation unit configured to acquire a loss distribution occurring in each of the cores from the backscattered light of each of the cores, and calculate the cumulative crosstalk from a connection loss at a connection point of the uncoupled multi-core fiber obtained from the loss distribution and a known inter-core mode coupling of each of the uncoupled multi-core fibers.

Further, an optical transmission line test method according to the present invention is a test method for measuring a cumulative crosstalk of an optical transmission line, the optical transmission line being formed by connecting a plurality of uncoupled multi-core fibers in series, the test method including:
  inputting an optical pulse to each of cores of the uncoupled multi-core fiber from one end of the optical transmission line;
  receiving backscattered light for each of the cores at one end of the optical transmission line;
  acquiring a loss distribution occurring in each of the cores from the backscattered light of each of the cores; and
  calculating the cumulative crosstalk from a connection loss at a connection point of the uncoupled multi-core fiber obtained from the loss distribution and a known inter-core mode coupling of each of the uncoupled multi-core fibers.

In the optical transmission line test apparatus and method, the output of each core from the other end of the optical transmission line is calculated by a matrix representing mode coupling of a connection point and a matrix representing mode coupling of an uncoupled multi-core fiber (known), and a cumulative crosstalk is calculated. Here, since mode coupling between cores occurring at the connection point is negligibly small in comparison with mode coupling between the cores occurring at each section of the uncoupled multi-core fiber, only an element of a connection loss between identical cores that can be acquired from backscattered light of a pulse test is taken into consideration for a matrix representing mode coupling of the connection point. That is, by measuring only the intensity of the backscattered light from the input core, the cumulative crosstalk of the entire optical transmission line can be calculated.

Therefore, the present invention can provide an optical transmission line test apparatus and a test method capable of measuring the cumulative crosstalk of an optical transmission line in which a plurality of uncoupled multi-core fibers are connected in series from one end side by an OTDR.

Specifically, the calculation unit is configured to: cause light input to one core at one end of the optical transmission line to propagate through the optical transmission line, and use a ratio of light intensities output from the one core and the other core at the other end of the optical transmission line as the cumulative crosstalk; and calculate the ratio of the light intensities by using a product of a connection point matrix representing the connection loss of the one core and the other core at each connection point and a fiber section matrix representing the inter-core mode coupling of each of the uncoupled multi-core fibers.

Moreover, since bending loss and connection loss have wavelength dependency, it is preferable to calculate the cumulative crosstalk for each wavelength of the optical pulse.

The calculation unit of the optical transmission line test apparatus can also be implemented by a computer and a program, and the program can be recorded in a recording medium or provided through a network.

The above inventions can be combined whenever possible.

Advantageous Effects of Invention

The present invention can provide an optical transmission line test apparatus and a test method capable of measuring the cumulative crosstalk of an optical transmission line in which a plurality of uncoupled multi-core fibers are connected in series from one end side with an OTDR.

DESCRIPTION OF EMBODIMENTS

Figure 1:
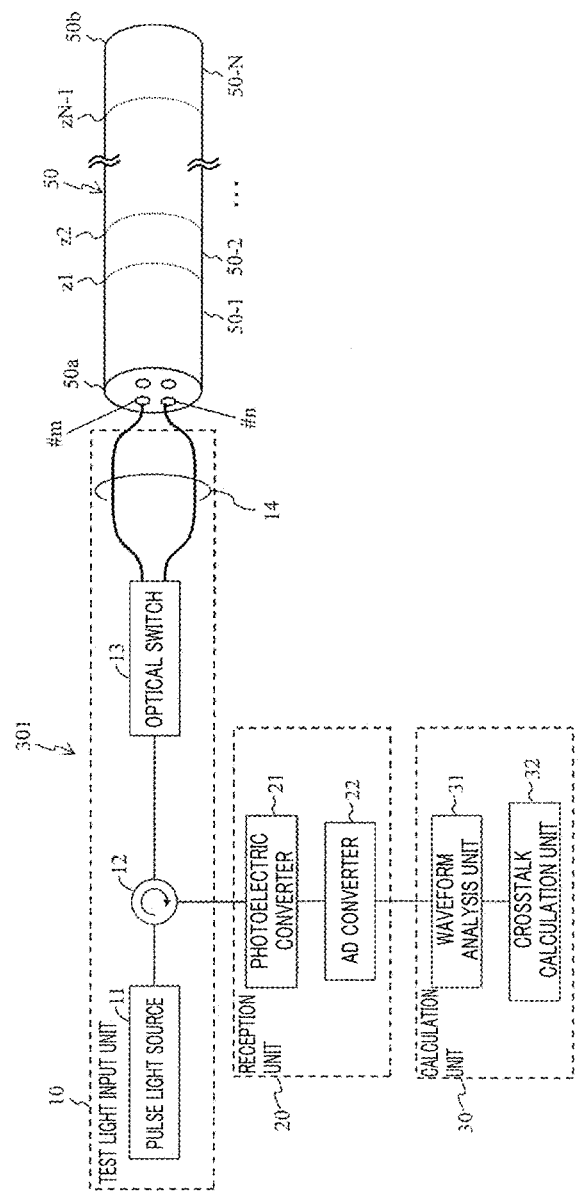
FIG. 1 is a diagram for describing an optical transmission line test apparatus according to the present invention.

Embodiments of the present invention will be described with reference to the accompanying drawings. The embodiments described below are examples of the present invention, and the present invention is not limited to the following embodiments. Constituent elements with the same reference numerals in the present specification and the drawings represent the same constituent elements.

First Embodiment

FIG. 1 is a diagram for describing a configuration of an optical transmission line test apparatus 301 according to the present embodiment. The optical transmission line test apparatus 301 is an optical transmission line test apparatus for measuring a cumulative crosstalk of an optical transmission line 50 in which a plurality of uncoupled multi-core fibers 50-$i$ (i is an integer from 1 to N) are connected in series, and the optical transmission line test apparatus 301 includes:

a test light input unit 10 that inputs optical pulses to each of cores of the uncoupled multi-core fiber 50-1 at one end 50$a$ of the optical transmission line 50;

a reception unit 20 that receives backscattered light for each of the cores output from one end 50$a$ of the optical transmission line 50; and a calculation unit 30 that acquires a loss distribution occurring in each of the cores from the backscattered light of each of the cores, and calculates the cumulative crosstalk from a connection loss at a connection point zj (j=i−1 and greater than or equal to 1) of the uncoupled multi-core fiber obtained from the loss distribution and a known inter-core mode coupling of each of the uncoupled multi-core fibers 50-$i$.

The test light input unit 10 includes a pulse light source 11, an optical circulator 12, an optical switch 13, and an input/output device 14. The pulse light source 11 outputs an optical pulse of an arbitrary wavelength. The optical circulator 12 passes the optical pulse from the pulse light source 11 in the direction of the optical transmission line 50. The input/output device 14 can input optical pulses to each of a plurality of cores appearing at one end 50$a$ of the optical transmission line 50. For example, the input/output device 14 is a fan-in/fan-out device for multi-core fibers. The optical switch 13 selects a path for inputting an optical pulse from the pulse light source 11 to any one of a plurality of cores appearing at one end 50$a$ of the optical transmission line 50.

The reception unit 20 includes a photoelectric converter 21 and an AD converter 22. When an optical pulse is input to one core (for example, a core #m) appearing at one end 50$a$ of the optical transmission line 50, the optical pulse propagates through the optical transmission line 50 to generate backscattered light (Rayleigh scattered light). The backscattered light is received by the photoelectric conversion unit 21 via the input/output device 14, the optical switch 13, and the optical circulator 12. The photoelectric converter 21 is, for example, a photodiode. The photoelectric converter 21 converts the light intensity of the received backscattered light (the light intensity with respect to the distance from one end 50$a$ of the optical transmission line 50) into an electrical signal. The AD converter 22 converts the analog electrical signal into a digital signal.

The calculation unit 30 includes a waveform analysis unit 31 and a crosstalk calculation unit 32. The operation of the calculation unit 30 will be described later.

Figure 2:
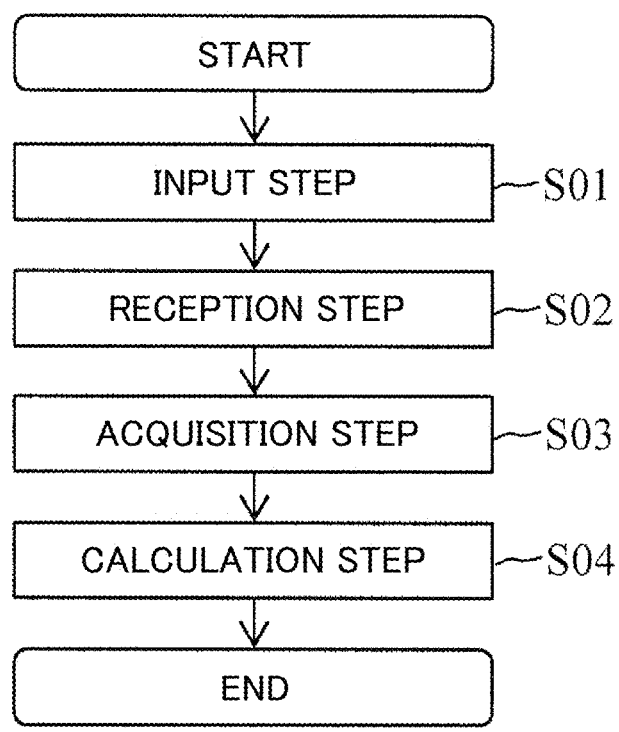
FIG. 2 is a diagram for describing an optical transmission line test method according to the present invention.

FIG. 2 is a diagram for describing a test method to be performed by the optical transmission line test apparatus 301. The test method includes an input step of inputting optical pulses to each of cores of the uncoupled multi-core fiber from one end 50$a$ of the optical transmission line 50 (step S01), a reception step of receiving backscattered light for each of the cores at one end 50$a$ of the optical transmission line 50 (step S02), an acquisition step of acquiring a loss distribution occurring in each of the cores from the backscattered light of each of the cores (step S03), and a calculation step of calculating the cumulative crosstalk from a connection loss at a connection point zj of the uncoupled multi-core fiber obtained from the loss distribution and a known inter-core mode coupling of each of the uncoupled multi-core fibers (step S04).

The details of the input step to the acquisition step will be described.

First, one arbitrary core (for example, a core #m) is selected by the optical switch 13. An optical pulse $P_{in}$ is input from one end 50a of the optical transmission line 50 to the core #m, and backscattered light $BC_m$ from the core #m is received. Then, the calculation unit 30 acquires a loss distribution in the longitudinal direction of the optical transmission line 50 from the backscattered light $BC_m$. Further, the waveform analysis unit 31 of the calculation unit 30 acquires, from a change in the intensity of backscattered light, a connection loss $\eta^{(j)}_{11}$ at a connection point zj between an uncoupled multi-core fiber 50-$i$ and an uncoupled multi-core fiber 50-$i$+1, from the loss distribution.

Subsequently, another core (for example, a core #n) is selected by the optical switch 13. An optical pulse $P_{in}$ (having the same wavelength as the optical pulse $P_{in}$ input to the core #m) is input from one end 50a of the optical transmission line 50 to the core #n, and backscattered light $BC_n$ from the core #n is received. Then, the calculation unit 30 acquires a loss distribution in the longitudinal direction of the optical transmission line 50 from the backscattered light $BC_n$. Further, the waveform analysis unit 31 of the calculation unit 30 acquires, from a change in the intensity of backscattered light, a connection loss $\eta^{(j)}_{22}$ at a connection point zj between an uncoupled multi-core fiber 50-$i$ and an uncoupled multi-core fiber 50-$i$+1, from the loss distribution.

The calculation step performed by the crosstalk calculation unit 32 of the calculation unit 30 will be described with reference to FIG. 3.

The crosstalk calculation unit 32
 causes an optical pulse $P_{in}$ input to one core (for example, a core #m) at one end 50a of the optical transmission line 50 to propagate through the optical transmission line 50, and uses a ratio of light intensities output from the one core (the core #m) and the other core (a core #n) at the other end 50b of the optical transmission line 50 as the cumulative crosstalk, and calculates the ratio of the light intensities by using a product of a connection point matrix $T_j$ representing the connection loss of the one core (the core #m) and the other core (the core #n) at each connection point Zj and a fiber section matrix $M_i$ representing the inter-core mode coupling of each of the uncoupled multi-core fibers 50-$i$.

Figure 3:
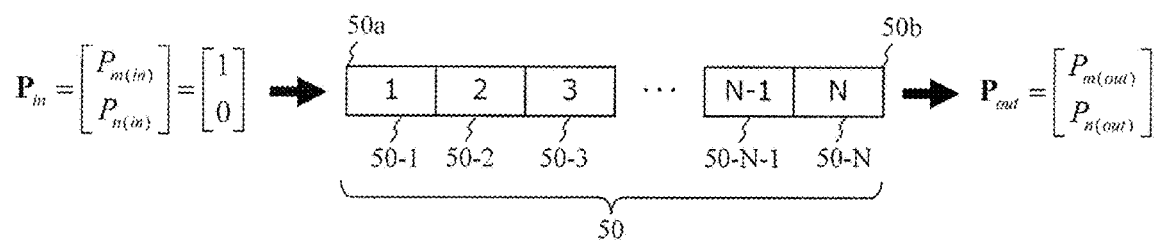
FIG. 3 is a diagram for describing input and output of an optical transmission line.

FIG. 3 illustrates a matrix of the optical pulses $P_{in}$ input to the core #m at one end 50a of the optical transmission line 50 and a matrix of optical pulses $P_{out}$, which result from the optical pulses $P_m$ propagating through the optical transmission line 50, output from respective cores (#m and #n) of the other end 50b of the optical transmission line 50. Since the matrix $P_{in}$ inputs optical pulses only to the core #m, the optical powers of its elements are $P_{m(in)}=1$ and $P_{n(in)}=0$. When optical pulses are input only to the core #n, the elements are reversed. The elements of the matrix $P_{out}$ are the optical power $P_{m(out)}$ of the optical pulse output from the core #m and the optical power $P_{n(out)}$ of the optical pulse output from the core #n.

The matrix $P_{out}$ can be represented by the following equation.

[Math. 1]

$$P_{out} = M_N T_{N-1} M_{N-1} T_{N-2} \ldots T_3 M_3 T_2 M_2 T_1 M_1 P_{in} \quad (1)$$

Here, $T_j$ is a matrix representing the mode coupling of the connection point zj.

[Math. 2]

$$T_j = \begin{bmatrix} \eta^{(j)}_{11} & \eta^{(j)}_{12} \\ \eta^{(j)}_{21} & \eta^{(j)}_{22} \end{bmatrix} \quad (2)$$

$\eta^{(j)}_{11}$: coupling efficiency between cores #m at connection point zj
$\eta^{(j)}_{12}$: coupling efficiency from core #n to core #m at connection point zj
$\eta^{(j)}_{21}$: coupling efficiency from core #m to core #n at connection point zj
$\eta^{(j)}_{22}$: coupling efficiency between cores #n at connection point zj Further, since mode coupling ($\eta^{(j)}_{12}, \eta^{(j)}_{21}$) between cores occurring at the connection point zj is negligibly small in comparison with the mode coupling ($m^{(i)}_{12}, m^{(i)}_{21}$) between cores occurring in each uncoupled multi-core fiber 50-$i$, a mode coupling matrix of the connection point zj can be approximated by the following equation.

[Math. 3]

$$T_j \cong \begin{bmatrix} \eta^{(j)}_{11} & 0 \\ 0 & \eta^{(j)}_{22} \end{bmatrix} \quad (3)$$

That is, the matrix $T_j$ representing the mode coupling of the connection point zj can be expressed by the connection losses ($\eta^{(j)}_{11}$ is a connection loss of the core #m at the connection point zj, $\eta^{(j)}_{22}$ is a connection loss of the core #n at the connection point zj) of each core at the connection point zj, and the values obtained in the acquisition step of step S03 can be used.

For example, $\eta^{(j)}_{11}$ can be obtained by converting a decibel-scale connection loss value Loss (loss value, corresponding to unevenness, occurring at the connection point zj in the OTDR waveform of the backscattered light), occurring in the backscattered light of the core #m, into a linear scale using the following equation.

[Math. 4]

$$\eta^{(j)}_{11} = 10^{(-LOSS/10)} \quad (4)$$

$M_i$ in Equation (1) is a matrix representing mode coupling between the cores occurring in each uncoupled multi-core fiber 50-$i$.

[Math. 5]

$$M_i = \begin{bmatrix} m^{(i)}_{11} & m^{(i)}_{12} \\ m^{(i)}_{21} & m^{(i)}_{22} \end{bmatrix} \quad (5)$$

$m_{11}^{(i)}$: coupling efficiency between cores #m in uncoupled multi-core fiber 50-*i*

$m_{12}^{(i)}$: coupling efficiency from core #n to core #m in uncoupled multi-core fiber 50-*i*

$m_{21}^{(i)}$: coupling efficiency from core #m to core #n in uncoupled multi-core fiber 50-*i*

$m_{22}^{(i)}$: coupling efficiency between cores #n in uncoupled multi-core fiber 50-*i*

Each element of the matrix $M_i$ can be obtained from a loss coefficient α, a power coupling coefficient h, and a fiber length $L_i$ of the uncoupled multi-core fiber 50-*i* as follows.

[Math. 6]

$$m_{11}^{(i)} = \exp(-\alpha L_i)\exp(-hL_i)\cosh(hL_i) \quad (6)$$
$$m_{12}^{(i)} = \exp(-\alpha L_i)\exp(-hL_i)\sinh(hL_i)$$
$$m_{21}^{(i)} = \exp(-\alpha L_i)\exp(-hL_i)\sinh(hL_i)$$
$$m_{22}^{(i)} = \exp(-\alpha L_i)\exp(-hL_i)\cosh(hL_i)$$

The matrix $M_i$ is known data that can be acquired in advance (for example, when manufacturing the uncoupled multi-core fiber 50-*i*).

In this way, the crosstalk calculation unit 32 can calculate light intensities ($P_{m(out)}$, $P_{n(out)}$) output from respective cores (#m, #n) of the other end 50*b* of the optical transmission line 50 by using a known loss coefficient α, a power coupling coefficient h, and a fiber length $L_i$ of the uncoupled multi-core fiber 50-*i* measured before construction of the optical transmission line 50, and the mode coupling matrix of the connection point zj obtained from the input step (step S01) to the acquisition step (step S03).

Then, the crosstalk calculation unit 32 calculates a cumulative crosstalk XT (logarithmic notation) in consideration of the influence of all the connection points zj of the optical transmission line 50 by substituting the light intensities ($P_{m(out)}$, $P_{n(out)}$) into the following equation.

[Math. 7]

$$XT = 10\log_{10}\left[\frac{P_{n(out)}}{P_{m(out)}}\right] \quad (\text{dB}) \quad (7)$$

The above-described calculation method performed by the crosstalk calculation unit 32 is for the case where the number of cores of the optical transmission line 50 is two, but even when the number of cores of the optical transmission line 50 is three or more, the connection loss at each connection point zj for each core may be measured. $T_j$ and $M_i$ in Equations (1) to (6) are determinants in which the number of rows and the number of columns are the number of cores.

Second Embodiment

An optical transmission line test apparatus according to the present embodiment has the same configuration as the optical transmission line test apparatus 301 described in the first embodiment. In the optical transmission line test apparatus, the pulse light source 11 outputs optical pulses of different wavelengths, and the calculation unit 30 calculates a cumulative crosstalk XT for each wavelength of the optical pulses.

When the test is performed with optical pulses of different wavelengths, the cumulative crosstalk XT including the influence of fiber accommodation bending near the connection point zj can be calculated for the mode coupling matrix $T_j$ of Equation (3). In other words, the optical transmission line test apparatus can obtain the cumulative crosstalk XT of the communication wavelength band which is easily affected by the fiber accommodation bending.

The greater the inter-core loss difference at the connection point zj is, the greater the influence on the cumulative crosstalk XT is. Since the bending loss and the connection loss have wavelength dependency, it is preferable to perform a test with optical pulses of a plurality of wavelengths in order to ascertain the quality of the connection point (connection point+accommodation bending). For example, since the change in the connection loss becomes more remarkable as the shorter the wavelength is, it is preferable to perform the test with an optical pulse having a wavelength on the shorter wavelength side in the communication wavelength band. On the other hand, since the change in the bending loss becomes more remarkable as the longer the wavelength is, it is preferable to perform the test with an optical pulse of a wavelength on the longer wavelength side in the communication wavelength band.

Other Embodiments

The calculation unit 30 of the optical transmission line test apparatus 301 can also be implemented by a computer and a program, and the program can be recorded in a recording medium or provided through a network.

REFERENCE SIGNS LIST

10 Test light input unit
11 Pulse light source
12 Optical circulator
13 Optical switch
14 Input/output device
20 Reception unit
21 Photoelectric conversion unit
22 AD conversion unit
30 Calculation unit
31 Waveform analysis unit
32 Crosstalk calculation unit
50 Optical transmission line
50-1, 50-2, . . . , 50-*i*, . . . , 50-N Uncoupled multi-core fiber
301 Optical transmission line test apparatus
Z1, z2, . . . , zj, . . . , zN−1 Connection point

The invention claimed is:

1. An optical transmission line test apparatus for measuring a cumulative crosstalk of an optical transmission line in which a plurality of uncoupled multi-core fibers are connected in series, the optical transmission line test apparatus comprising:
 a test light input unit configured to input an optical pulse to each of the cores of the uncoupled multi-core fiber from one end of the optical transmission line;
 a reception unit configured to receive backscattered light for each of the cores at one end of the optical transmission line; and
 a calculation unit configured to acquire a loss distribution occurring in each of the cores from the backscattered light of each of the cores, and calculate the cumulative crosstalk from a connection loss at a connection point of the uncoupled multi-core fiber obtained from the loss distribution and a known inter-core mode coupling of each of the uncoupled multi-core fibers.

2. The optical transmission line test apparatus according to claim 1, wherein the calculation unit is configured to:
cause light input to one core at one end of the optical transmission line to propagate through the optical transmission line, and use a ratio of light intensities output from the one core and the other core at the other end of the optical transmission line as the cumulative crosstalk; and
calculate the ratio of the light intensities by using a product of a connection point matrix representing the connection loss of the one core and the other core at each connection point and a fiber section matrix representing the inter-core mode coupling of each of the uncoupled multi-core fibers.

3. The optical transmission line test apparatus according to claim 1, wherein the calculation unit is configured to calculate the cumulative crosstalk for each wavelength of the optical pulse.

4. A test method for measuring a cumulative crosstalk of an optical transmission line,
the optical transmission line being formed by connecting a plurality of uncoupled multi-core fibers in series, the test method comprising:
inputting an optical pulse to each of cores of the uncoupled multi-core fiber from one end of the optical transmission line;
receiving backscattered light for each of the cores at one end of the optical transmission line;
acquiring a loss distribution occurring in each of the cores from the backscattered light of each of the cores; and
calculating the cumulative crosstalk from a connection loss at a connection point of the uncoupled multi-core fiber obtained from the loss distribution and a known inter-core mode coupling of each of the uncoupled multi-core fibers.

5. The test method according to claim 4, further comprising:
causing light input to one core at one end of the optical transmission line to propagate through the optical transmission line, and using a ratio of light intensities output from the one core and the other core at the other end of the optical transmission line as the cumulative crosstalk; and
calculating the ratio of the light intensities by using a product of a connection point matrix representing the connection loss of the one core and the other core at each connection point and a fiber section matrix representing the inter-core mode coupling of each of the uncoupled multi-core fibers.

6. The test method according to claim 4, further comprising: calculating the cumulative crosstalk for each wavelength of the optical pulse.

* * * * *